United States Patent [19]
Robertson et al.

[11] Patent Number: 4,867,334
[45] Date of Patent: Sep. 19, 1989

[54] CONDUIT BODY ASSEMBLY COVER

[75] Inventors: John C. Robertson, Bloomfield; Donald A. Sementilli, Southington, both of Conn.

[73] Assignee: General Signal Corporation, Stamford, Conn.

[21] Appl. No.: 212,820

[22] Filed: Jun. 29, 1988

[51] Int. Cl.$^4$ .............................................. B65D 45/00
[52] U.S. Cl. ..................................... 220/243; 174/66
[58] Field of Search ............... 220/243, 327, 328, 235, 220/236; 174/66

[56] References Cited
U.S. PATENT DOCUMENTS

| | | | |
|---|---|---|---|
| 2,703,663 | 3/1955 | Connett | 220/243 |
| 2,832,494 | 4/1958 | Baldwin | 220/243 |
| 3,902,625 | 9/1975 | Schmidhuber | 220/246 |
| 4,291,816 | 9/1981 | Lamoureux | 220/243 |

Primary Examiner—George T. Hall
Attorney, Agent, or Firm—Joseph P. Abate; Robert S. Smith

[57] ABSTRACT

A cover assembly apparatus dimensioned and configured for engagement with an associated conduit body having an opening for access to the interior. The apparatus includes a generally plate shaped member, a bow shaped member having flanges extending from the extremities thereof, the flanges dimensioned and configured for engagement with an interface of the associated conduit body, the bow shaped member having a convex side thereof disposed in abutting relationship to the plate shaped member, and apparatus for urging the flanges against respective portions of the plate shaped member to cause the bow shaped member to be less bowed and thus to have a greater length intermediate length as measured between the respective flanges thereof.

15 Claims, 2 Drawing Sheets

CONDUIT BODY ASSEMBLY COVER

BACKGROUND OF THE INVENTION

This invention relates to conduit fittings or bodies as used in electrical wiring systems, and more specifically to construction of the access cover plate for the body. The cover may be provided with seals to limit entry of moisture into the conduit.

Conduit bodies are employed in electrical wiring systems in which electrical conductors are routed through rigid conduit. They normally incorporate two or more cylindrical portions with internal threads, into which the threaded ends of the rigid conduit are assembled. A removable cover plate allows access to the interior of the body, and permits pulling a group of conductors through the conduit, or making electrical connections as required. Some bodies incorporate internal threaded portions at right angles to one another to permit the conductors to make a right angle turn. Some styles have a side outlet that permits one or more of the conductors to leave the basic bundle and be routed into their own conduit as required. Although the detailed design of the body may vary from manufacturer to manufacturer, there is sufficient standarization to permit units from different manufacturers to be interchanged.

The prior art includes various structures for securing the cover plate to the body proper. In some cases the cover is merely secured to the body by screws passing through the flange area of the cover and threading into a suitable hole in the body. Assembly is easily accomplished, but the screws are loose pieces and can be easily lost. If the cover plate is to be removed and reinstalled a number of times, the hole in the body into which the screw assembles can rust and break off on occasion which causes a difficult drilling and tapping problem. In the drawings that accompany this specification, FIG. 6 illustrates an example of a typical prior art construction. In this design the screw is captured and becomes a part of the the cover, but the detail parts involved—a formed sheet metal detail, a sleeve which is riveted in place, and a formed dog with a threaded hole—appear to be unnecessarily complex and costly. This and similar prior art constructions basically employ an inclined ramp or plane that forces the dog outward beyond the axial extremity of the elongated cover as the screw is tightened.

It is a primary object of the invention to provide apparatus which has a minimum number of parts and which is easy to manufacture and assemble.

It is an object of this invention to provide a cover plate assembly capable of being assembled and disassembled repeatedly without deterioration of the ability of the cover to seal.

It is a further object of this invention to provide a cover plate system in which the attaching screws are captured and not loose pieces.

A still further object is a cover plate that is easily assembled and removed without any special tools.

Another object of the invention is to provide a conduit body that is interchangeable with other bodies that are currently available.

Other objects and advantages of the present invention will readily occur to one skilled in the art to which the invention pertains upon reference to the following detailed description.

SUMMARY OF THE INVENTION

It has been found that these and other objects of the invention may be attained in a cover assembly apparatus dimensioned and configured for engagement with an associated conduit body having an opening for access to the interior thereof which comprises a generally plate shaped member and a bow shaped member having flanges extending from the extremities thereof. The flanges are dimensioned and configured for engagement with an inner face of the associated conduit body and, the bow shaped member has a convex side thereof disposed in abutting relationship to the plate shaped member. Means are provided for urging the flanges toward respective portions of the plate shaped member to cause the bow shaped member to be less bowed and thus to have a greater effect length intermediate the respective flanges thereof.

The means for urging may comprise respective machine screws and each of the flanges may include a threaded bore dimensioned and configured for engagement with a respective machine screw. The plate shaped member may include a recess dimensioned and configured for locating the bow shaped member and the recess in the plate shaped member may be elongated. Each of the flanges may include a boss surrounding the threaded bore and at least a part of the bosses or bushing shaped members may be dimensioned and configured and located a distance apart which may be greater than the maximum length of the recess in the plate shaped member.

The bow shaped member may be manufactured of an elastic material whereby the bow shaped member may repeatedly deform with the application of an external force to a more straight form upon the application of an external force and may reassume a bow shaped form upon release of the external force. The bow shaped member may be fabricated of a plate shaped member whereby the bow shaped member may have a substantial portion thereof formed as a curvilinear planar form.

DESCRIPTION OF THE PREFERRED EMBODIMENT

Figure 1:
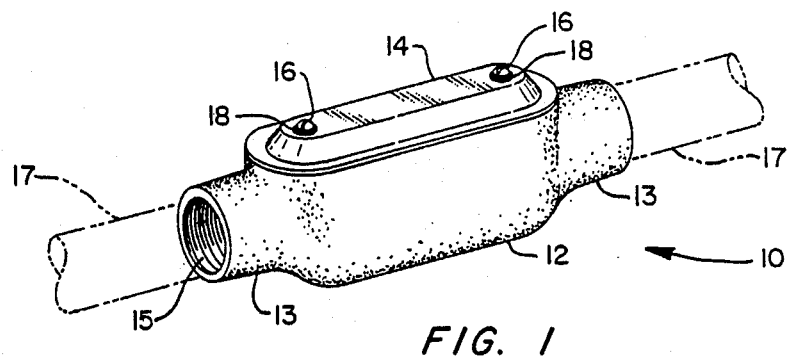
FIG. 1 is a perspective view of a conduit body made in accordance with this invention.

Referring now to the drawings, the numeral 10 refers generally to the conduit body assembly, which comprises a body 12, cover plate 14, retainer 20, screws 16, and washers 18. The body 12 incorporates end portions 13 which contain internal threads 15. The internal threads 15 accept the external threads on standard rigid conduit 17, (shown in phantom in FIG. 1). The body 12 has a planar surface 19 on one side, in which is provided longitudinal opening 29. It is against the planar surface 19 that the cover plate 14 is clamped.

Figure 2:
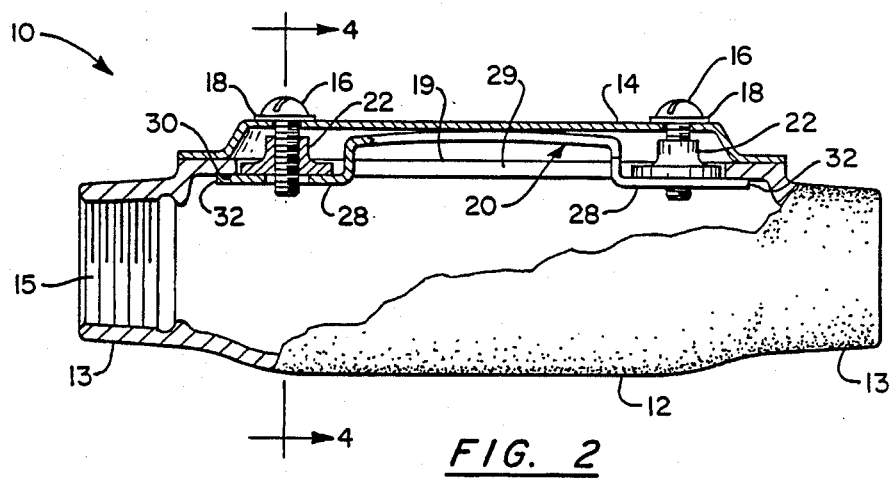
FIG. 2 is a front view, partially in section, of the conduit body shown in FIG. 1.
Figure 3:
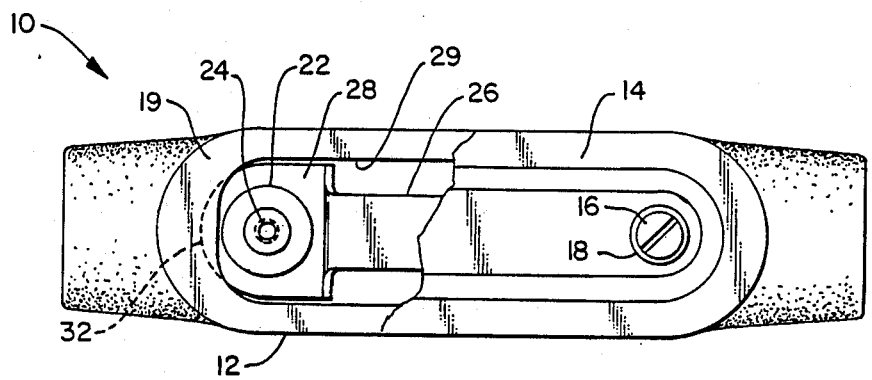
FIG. 3 is a top view of the conduit body.
Figure 4:
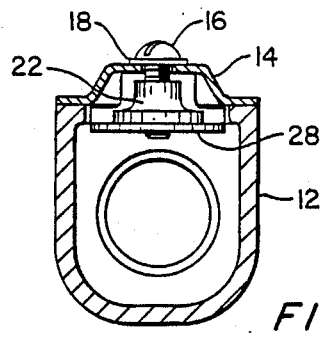
FIG. 4 is a sectional view taken along lines 4—4 in FIG. 2.

The element that provides retention of the cover 14 to the body 12 is the retainer 20. The retainer 20 is essentially a connecting strap between the two screws 16. It consists of a central bow shaped portion 26, enlarged end portions or flanges 28 disposed at each axial extremity of the bow shaped portion 26, and bosses or bushing shaped members 22, 22. As shown in FIG. 2, the central portion 26 is formed upward or bowed to occupy the space directly under the cover 14, thereby not encroaching upon the volume needed for conductors in the main portion of the body 12. The bow shaped portion 26 is preferably formed of spring tempered high carbon steel. In other forms of the invention other elastic materials may be utilized. On each enlarged portion 28 bosses or bushing shaped members 22 with a threaded hole 24 are secured by welding, brazing, or other means or are integrally formed with the enlarged portion 28. The bosses or bushing shaped members 22 are spaced apart to match the spacing of the screws 16. The width of the enlarged portions 28 is such as to fit freely into the opening 29. However, the overall length of the retainer 20 is greater than the length of the opening 29. Thus, when the retainer 20 is in the final position, (as shown in FIGS. 2 and 3), and the screws 16 are tightened, the extreme ends 32 of the retainer 20 are pulled up against the surface 30 and provide retention; at the same time the cover 14 is clamped securely against the planar surface 19 of the body 12.

Figure 5:
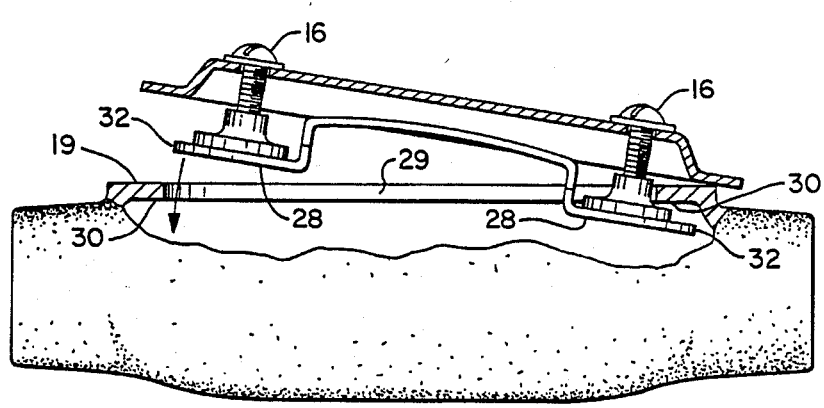
FIG. 5 is a front view, partially in section, showing the method of assembly of the cover plate.

Since the overall length of the retainer 20 is greater than the length of the opening 29, it cannot be inserted directly into the opening 29. FIG. 5 illustrates the method of insertion. One of the screws 16 is backed off sufficiently to allow that end of the retainer 20 to be inserted into the opening 29, then shifted (to the right as seen in FIG. 5) to allow the end of the opening 29 to come up against the small diameter of the boss or bushing shaped member 22. This will then allow the opposite end of of the retainer 20 to drop into the opening 29. A slight shift of the retainer 20 (to the left as seen in FIG. 5) will put it in a position where both ends of the retainer 20 may be drawn up against surface 30 by tightening screws 16, thereby completing the assembly. It will be understood that the tightening of the screws 16 increases the effective length of the bow shaped portion 26.

Figure 6:
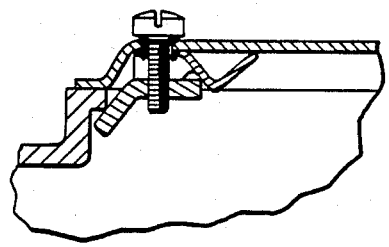
FIG. 6 is a partial sectional view showing the method of cover plate attachment of a prior art configuration.

It will be understood that the prior art illustrated in FIG. 6 utilized an inclined ramp or plane to force a dog outward. The present invention utilizes a bow shaped strap or portion 26 which is straightened to increase the effective length.

Although this invention has been described with reference to the attached drawing, it will be obvious that various changes and modifications may be made without departing from the spirit of the invention. Therefore, the details of the invention are to be limited only by the scope of the appended claims.

Having thus described my invention we claim:

1. A cover assembly apparatus dimensioned and configured for engagement with an associated conduit body having an opening for access to the interior thereof and having an inner face surrounding the opening which comprises:
   a generally plate shaped member;
   a bow shaped member having flanges extending from the extremities thereof, said flanges dimensioned and configured for engagement with an inner face of the associated conduit body, said bow shaped member having a convex side thereof disposed in abutting relationship to said plate shaped member; and
   means for urging said flanges against respective portions of said plate shaped member to cause said bow shaped member to be less bowed and thus to have a greater length intermediate as measured between the respective flanges thereof.

2. The apparatus as described in claim 1 wherein:
said means for urging comprises respective machine screws.

3. The apparatus as described in claim 2 wherein:
each of said flanges includes a threaded bore dimensioned and configured for engagement with a respective machine screw.

4. The apparatus as described in claim 3 wherein:
said plate shaped member includes a recess dimensioned and configured for locating said bow shaped member.

5. The apparatus as described in claim 4 wherein:
said recess in said plate shaped member is elongated.

6. The apparatus as described in claim 5 wherein:
each of said flanges includes a boss surrounding said threaded bore, said boss being dimensioned and configured and located with at least a part thereof spaced a distance apart which is greater than the maximum length of said recess in said plate shaped member.

7. The apparatus as described in claim 1 wherein:
said bow shaped member is manufactured of an elastic material whereby said bow shaped member will repeatedly deform with the application of external forces to a more straight form upon the application of external forces and will reassume a bow shaped form upon release of those external forces.

8. The apparatus as described in claim 7 wherein:
said bow shaped member is fabricated of a plate shaped member whereby said bow shaped member has a substantial portion thereof formed as a curvilinear planar form.

9. A cover assembly apparatus dimensioned and configured for engagement with an associated conduit body having an opening for access to the interior thereof which comprises:
   a bowed curvilinear planar member having flanges extending from the extremities thereof, said flanges dimensioned and configured for engagement with an inner face of the associated conduit body, said bow shaped member having a convex side thereof disposed in abutting relationship to said plate shaped member; and
   means for urging said flanges against respective portions of said plate shaped member to cause said bow shaped member to be less bowed and thus to have a greater effective length intermediate the respective flanges thereof.

10. The apparatus as described in claim 9 wherein:
said bowed curvilinear member is formed of spring tempered high carbon steel.

11. The apparatus as described in claim 10 wherein:
said means for urging comprises respective machine screws.

12. The apparatus as described in claim 11 wherein:
each of said flanges includes a threaded bore dimensioned and configured for engagement with a respective machine screw.

13. The apparatus as described in claim 12 wherein:
said plate shaped member includes a recess dimensioned and configured for locating said bow shaped member.

14. The apparatus as described in claim 13 wherein:

said recess in said plate shaped member is elongated.

15. The apparatus as described in claim 14 wherein: each of said flanges includes a boss surrounding said threaded bore, said boss being dimensioned and configured and located, at least a part of said bosses or bushing shaped members being spaced a distance apart which is greater than the maximum length of said recess in said plate shaped member.

* * * * *